E. BUGATTI.
CHANGE SPEED GEARING.
APPLICATION FILED AUG. 27, 1913.

1,099,587.

Patented June 9, 1914.

Witnesses

Inventor
Ettore Bugatti
by his attorney.

UNITED STATES PATENT OFFICE.

ETTORE BUGATTI, OF MOLSHEIM, GERMANY.

CHANGE-SPEED GEARING.

1,099,587.   Specification of Letters Patent.   Patented June 9, 1914.

Application filed August 27, 1913. Serial No. 786,890.

*To all whom it may concern:*

Be it known that I, ETTORE BUGATTI, a subject of the King of Italy, and residing at Molsheim, Alsace-Lorraine, Germany, have invented certain new and useful Improvements in Change-Speed Gearing, of which the following is a specification.

The present invention has reference to improvements in variable speed gears, and relates more particularly to change speed gearing of the type in which a number of transmission wheels, freely mounted on a hollow shaft, can be operatively connected to this shaft, one at a time, by means of a plunger axially slidable within the shaft.

According to this invention, the driving shaft, supporting the series of transmission wheels to be selectively driven, is hollow and is provided with sets of obliquely extending perforations in which are loosely contained balls, which by the axial displacement of the plunger are brought into, or out of, connection with the shaft, for the purpose of locking the respectively selected wheel to the shaft, or disconnecting it therefrom, as the case may be. The construction is such that the several transmission wheels can be arranged closely adjacent to one another, and the operative displacement of the plunger, consequently, is only equal to the width of a wheel.

In order to make this invention more readily understood, I will now describe it with reference to the accompanying drawing, in which—

Figure 1:
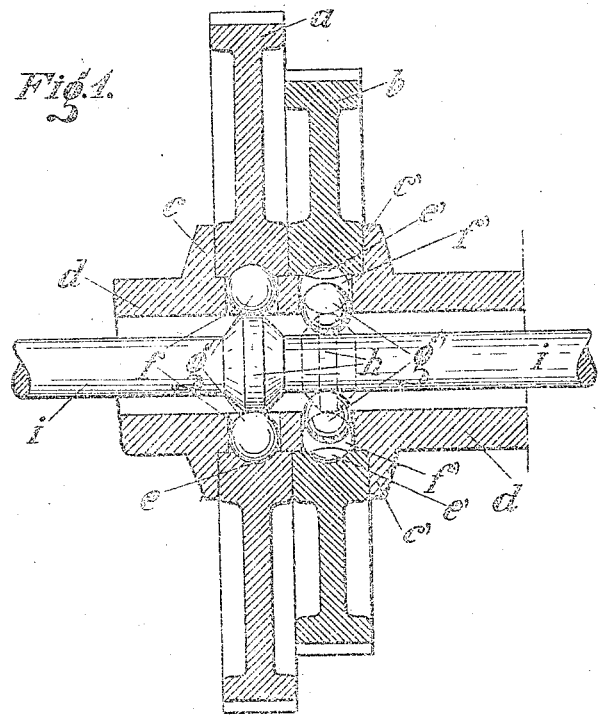
Figure 2:
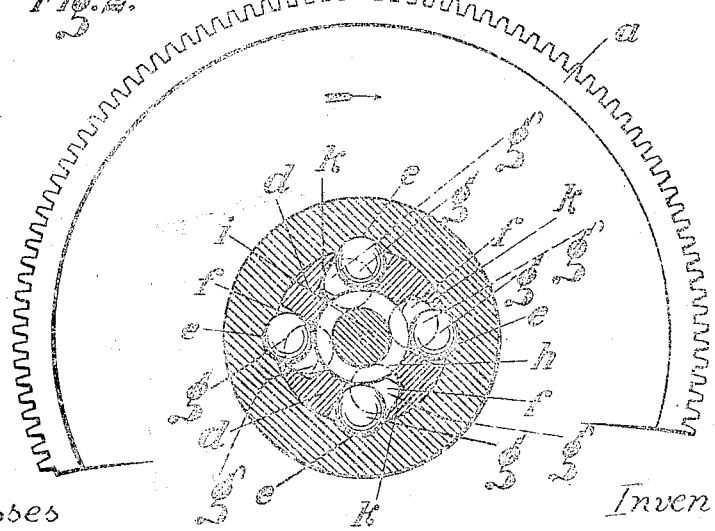

Figure 1 represents a longitudinal section through the improved gearing, and Fig. 2 shows a cross section therethrough, with the transmission wheel partly broken away.

The toothed wheels $a$, $b$ of the gearing are loosely mounted on the hollow shaft $d$ between flanges $c$, $c'$ and are provided at their bores or centers with cups $e$ and $e'$ respectively. The hollow shaft is provided in the center plane of each toothed wheel with obliquely extending perforations $f$, $f'$ in which are loosely housed the balls $g$, $g'$. As shown, four such perforations always form a set, the sets being arranged parallel to one another, but it is to be understood that any other number of perforations may be used to form a set. A rod $i$, carrying a plunger $h$, can be axially shifted by suitable means within the shaft $d$, and the plunger thereby respectively be brought into, and out of, operative contact with the sets of balls. As shown in the drawing, the plunger coöperates with the set of balls $g$ and has forced them outwardly into the cups $e$ of the wheel $a$, thereby locking this latter wheel to the shaft $d$. The set of balls $g'$, meanwhile, contacts with the rod $i$. By shifting the rod toward the right, the plunger then assuming the position shown in dotted lines in Fig. 1, the balls $g'$ are forced outwardly into the cups $e'$ of wheel $b$, thus locking this wheel to the driving shaft $d$. The now no longer supported balls $g$ are forced inwardly in their passages $f$ by the overhanging or claw-shaped driving edge $k$ of these passages acting on them, until the balls finally assume the position shown in dotted lines in Fig. 2, out of contact with the wheel base.

In the drawing only two sets of shaft perforations, balls and transmission wheels are shown by way of example, but it is obvious that any larger number of sets may be provided in the same manner and with the same effect, and, furthermore, the wheels may also be devoid of teeth, and then act in the manner of pulleys.

What I claim is:—

1. In a change speed gearing, in combination with a hollow shaft having sets of obliquely extending perforations, transmission wheels thereon, sets of balls in said shaft perforations, means for selectively forcing said sets of balls, one at a time, into coöperation with the respective transmission wheels, said hollow shaft having means for forcing the balls out of operative contact with the transmission wheels.

2. In a change speed gearing, in combination with a hollow shaft having parallel sets of obliquely extending perforations, sets of balls in these shaft perforations, transmission wheels loosely mounted on said shaft and having cup-shaped recesses in their base, said shaft perforations and said cups adapted to register, slidable means within said shaft for selectively forcing the said sets of balls into locking contact with the respective transmission wheels, the overhanging driving edge of said shaft perforations serving as means for forcing back the balls again, for the purpose of breaking the operative connection between shaft and wheel.

In testimony whereof I affix my signature in presence of two witnesses.

ETTORE BUGATTI.

Witnesses:
MILO S. JEWETT,
JOSEPH ROHMER.